United States Patent
Nagano

(10) Patent No.: US 6,888,881 B1
(45) Date of Patent: May 3, 2005

(54) REPEATER

(75) Inventor: Junichi Nagano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 633 days.

(21) Appl. No.: 10/049,906

(22) PCT Filed: Jun. 20, 2000

(86) PCT No.: PCT/JP00/04018

§ 371 (c)(1),
(2), (4) Date: Feb. 20, 2002

(87) PCT Pub. No.: WO01/99308

PCT Pub. Date: Dec. 27, 2001

(51) Int. Cl.$^7$ .............................. H04B 3/36; H04B 7/15
(52) U.S. Cl. ..................... 375/211; 370/274; 370/315; 379/338; 455/7
(58) Field of Search .............................. 375/211, 214; 455/7, 13.3, 23; 370/315, 274; 379/338

(56) References Cited

U.S. PATENT DOCUMENTS 4,701,935 A * 10/1987 Namiki ....................... 375/214

FOREIGN PATENT DOCUMENTS

| EP | 0 801 474 | 10/1997 |
| JP | 11-298421 | 10/1999 |

OTHER PUBLICATIONS

Kouji Kawashima et al.: "Chijo–ha Digital TV Housou no SFN Chuukei ni okeru Mawarikomi–ha Canceller" Denshi Joho Tsuushin Gakkai Gihou It 98–11 May 1998.
H. Suzuki, et al., Vehicular Technology Conference, pp. 1516–1520, XP–010353231, "A Booster Configuration with Adaptive Reduction of Transmitter–Receiver Antenna Coupling for Pager Systems", Sep. 19, 1999.
Patent Abstracts of Japan, JP 11–298421, Oct. 29, 1999.

* cited by examiner

Primary Examiner—Temesghen Ghebretinsae
(74) Attorney, Agent, or Firm—Oblon, Spivak, McClelland, Maier & Neustadt, P.C.

(57) ABSTRACT

A relay station is composed of a main reception antenna 1 for receiving both a radio wave of a parent station and a go-around radio wave of a relay station, a subsidiary reception antenna 2 for receiving the go-around radio wave of the relay station, a changeable attenuator 3 and a phase shifting unit 4 for changing an amplitude and phase of a signal received in the subsidiary reception antenna 2, a composite signal producing unit 5 for producing a composite signal from a signal received in the main reception antenna 1 and the signal sent from the phase shifting unit 4, an electric power detecting unit 9 for obtaining a composite electric power from a composite voltage extracted in a directivity coupling unit 8, and a microcomputer 10 for controlling a change of amplitude in the changeable attenuator 3 and a change of phase in the phase shifting unit 4 so as to minimize an average value of the composite electric power obtained in the electric power detecting unit 9.

4 Claims, 4 Drawing Sheets

REPEATER

TECHNICAL FIELD

The present invention relates to a relay device used for terrestrial broadcasting in which both a reception frequency and a transmission frequency having the same value as each other are used.

BACKGROUND ART

In a terrestrial television broadcasting system, a relay device is installed in a relay station to send out a broadcast radio wave to regions such as a mountainous region in which it is difficult to receive the broadcast radio wave. In this relay device, a broadcast radio wave transmitted from a parent station is received, amplified and again sent out.

Also, the adoption of an orthogonal frequency division multiplex (OFDM) method is determined in Europe and Japan as a transmission method of digital terrestrial broadcasting. In this OFDM method, because a plurality of signals having the same frequency as each other can be used in an area, a single frequency network (SFN) can be used.

Therefore, it is studied to prepare the SFN in the terrestrial digital broadcasting, and it is studied to use the reception frequency and the transmission frequency having the same value as each other in a relay device so as to efficiently use the frequency. In cases where the reception frequency and the transmission frequency in a relay device of a relay station are the same as each other, both a radio wave transmitted from a parent station and a radio wave transmitted from the relay station are received in a reception antenna of the relay device. In this case, there is a possibility that a signal is oscillated in an amplifying unit of the relay device and a broadcast service cannot be performed.

To prevent the oscillation of the amplifying unit of the relay device of the relay station, it is required that a received electric power D of the radio wave received in the parent station and a received electric power U of a transmission radio wave (or a go-around radio wave) of the relay station satisfy a condition D>U. However, because the electric power of the radio wave transmitted from the relay device is sufficiently higher than the electric power of the radio wave received in the relay device, it is not generally easy that the condition D>U is satisfied. Therefore, various methods have been proposed to remove the go-around radio wave and to sufficiently reduce the received electric power U of the transmission radio wave of the relay station.

As a method of removing the go-around radio wave by using a reception antenna, a method of canceling-out the go-around radio wave by using a plurality of reception antennas has been proposed. FIG. 1 is a block diagram showing the configuration of a conventional relay device disclosed in Published Unexamined Japanese Patent Application No. H11-298421 (1999).

In FIG. 1, 1 indicates a main reception antenna for receiving both a radio wave (of a frequency $f_1$) transmitted from a parent station and a go-around radio wave of a relay station in which the relay device is installed. 2 indicates a subsidiary reception antenna for receiving the go-around radio wave of the relay station. 3 indicates a changeable attenuator for changing an amplitude of a reception signal of the go-around radio wave received in the subsidiary reception antenna 2 by a preset attenuation factor. 4 indicates a phase shifting unit (or phase shifter) for changing a phase of a signal output from the changeable attenuator 3 by a preset shifting phase value. 5 indicates a composite signal producing unit (or composite signal producer) for producing a composite signal from both a signal of the radio wave of the parent station and a signal of the go-around radio wave received in the main reception antenna 1 and the signal sent from the phase shifting unit 4. 6 indicates an amplifying unit for amplifying the composite signal produced in the composite signal producing unit 5. 7 indicates a transmission antenna for transmitting a transmission radio wave (of the frequency $f_1$) of the relay station according to the composite signal amplified in the amplifying unit 6.

Next, an operation will be described below.

The main reception antenna 1 has a directivity in the direction of the parent station, and the radio wave transmitted from the parent station is received in the main reception antenna 1. Also, a go-around radio wave transmitted from the transmission antenna 7 of the relay station is mixed with the radio wave of the parent station and is received in the main reception antenna 1. A reception signal composed of a mixture of the radio wave of the parent station and the go-around radio wave is received in the composite signal producing unit 5. The subsidiary reception antenna 2 is directed towards the transmission antenna 7, and the go-around radio wave transmitted from the transmission antenna 7 of the relay station is received in the subsidiary reception antenna 2. An amplitude of a reception signal of the go-around radio wave is changed by a preset attenuation factor in the changeable attenuator 3. A phase of a signal received in the phase shifting unit 4 is changed by a preset shifting phase value, and the signal is output to the composite signal producing unit 5.

In the composite signal producing unit 5, a composite signal is produced from a signal of a mixture of the radio wave of the parent station and the go-around radio wave received in the main reception antenna 1 and a signal of the go-around radio wave which is received in the subsidiary reception antenna 2 and of which the amplitude and the phase are adjusted. In this case, the attenuation factor of the changeable attenuator 3 and the shifting phase value of the phase shifting unit 4 are set so as to produce a composite signal from a signal of the go-around radio wave received in the main reception antenna 1 and a signal of the go-around radio wave received in the subsidiary reception antenna 2 having the same amplitude as each other at phases opposite to each other. Therefore, the signal of the go-around radio wave is canceled out in the composite signal, and the output of the composite signal producing unit 5 is composed of the composite signal of only the radio wave component of the parent station.

Because the conventional relay device has the above-described configuration, when characteristics of the main reception antenna 1, the subsidiary reception antenna 2 and/or the transmission antenna 7 are changed due to a change of the environment caused by wind, snow or the like, the two go-around radio waves received in the composite signal producing unit 5 do not have the same amplitude as each other at the phases opposite to each other. Therefore, a problem has arisen that the go-around radio wave cannot be completely removed from the composite signal.

Also, in cases where the conventional relay device is set so as to be automatically adapted for the change of the environment, it is required to distinguish the go-around radio wave from the radio wave of the parent station. Therefore, as is described in the patent application, another problem has arisen that it is required to superpose a relay station identification signal on the transmission radio wave of the relay station transmitted from the transmission antenna 7.

The present invention is provided to solve the above-described problem, and the object of the present invention is to provide a relay device in which a go-around radio wave can be canceled out without the superposition of a relay station identification signal while being adapted for a change of the environment caused by wind or snow.

DISCLOSURE OF THE INVENTION

A relay device according to the present invention, in which a radio wave of a parent station is received and amplified and a transmission radio wave having the same frequency as that of the radio wave of the parent station is transmitted, comprises a main reception antenna for receiving both the radio wave of the parent station and a go-around radio wave of a relay station, a subsidiary reception antenna for receiving the go-around radio wave of the relay station, a changeable attenuator for changing an amplitude of a signal of the go-around radio wave received by the subsidiary reception antenna, a phase shifter for changing a phase of the signal of the go-around radio wave received by the subsidiary reception antenna, a composite signal producer for producing a composite signal from a signal of the radio wave of the parent station received by the main reception antenna, the signal of the go-around radio wave of the relay station and the signal of which the amplitude is changed by the changeable attenuator and the phase is changed by the phase shifter, a directivity coupler for extracting a composite voltage of the composite signal output from the composite signal producer, an electric power detector for obtaining a composite electric power from the composite voltage extracted by the directivity coupler, and a microcomputer for controlling both a change of the amplitude performed by the changeable attenuator and a change of the phase performed by the phase shifter so as to minimize an average value of the composite electric power obtained by the electric power detector.

Therefore, the go-around radio wave can be cancelled while the relay device is adapted for a change of an environment of the relay device.

The relay device according to the present invention further comprises an output controller for controlling an output of the transmission radio wave transmitted from the relay station according to an instruction of the microcomputer when the supply of an electric power is started.

Therefore, the oscillation occurring in the relay device can be suppressed when the supply of an electric power to the relay device is started.

In the relay device according to the present invention, an initial operation point of the changeable attenuator and an initial operation point of the phase shifter are automatically detected by the microcomputer by obtaining a minimum value of the composite electric power obtained by the electric power detector.

Therefore, the detection of initial operation points of both the changeable attenuator and the phase shifter performed by measuring the amplitude and phase of the go-around radio wave is not required.

The relay device according to the present invention further comprises an output controller for controlling an output of the transmission radio wave transmitted from the relay station according to an instruction of the microcomputer when an initial operation point of the changeable attenuator and an initial operation point of the phase shifter are automatically detected by the microcomputer.

Therefore, the oscillation occurring in the relay device can be suppressed during the automatic detection of the initial operation points performed by the microcomputer.

BEST MODE FOR CARRYING OUT THE INVENTION

Hereinafter, the best mode for carrying out the present invention will now be described with reference to the accompanying drawings to explain the present invention in more detail.

Embodiment 1

Figure 1:
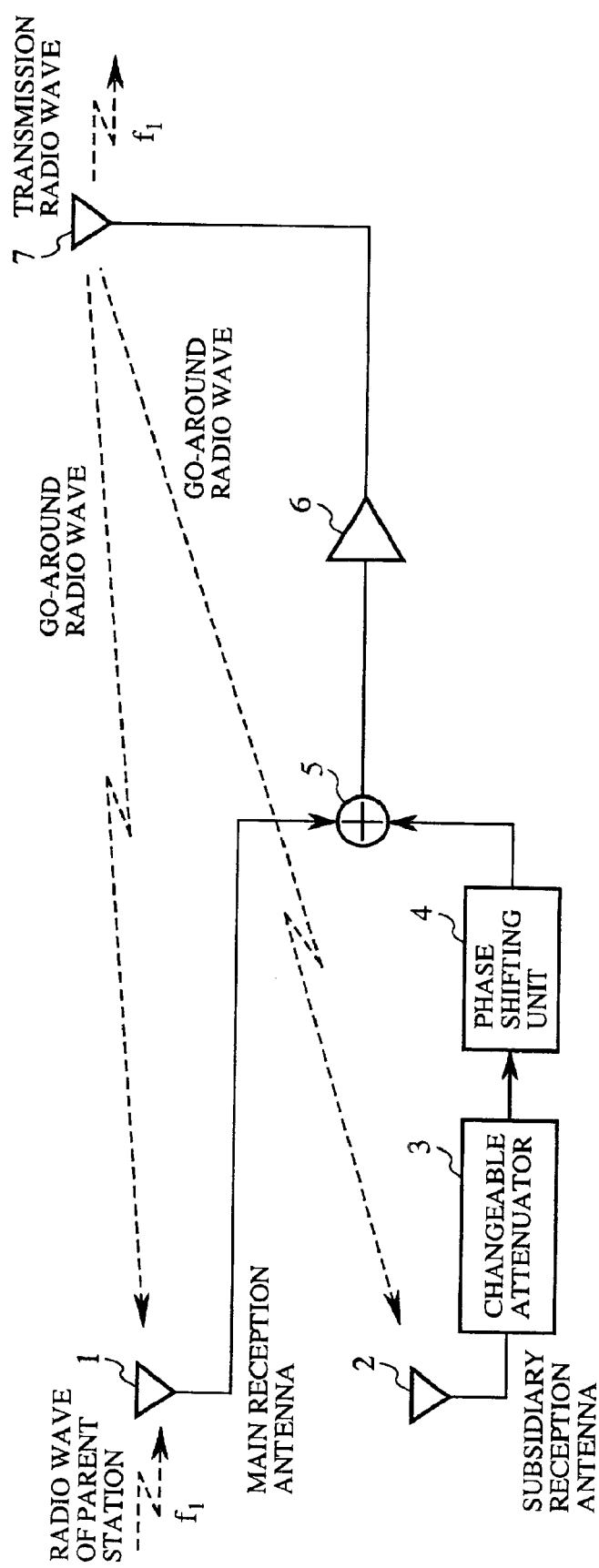
FIG. 1 is a block diagram showing the configuration of a conventional relay device.
Figure 2:
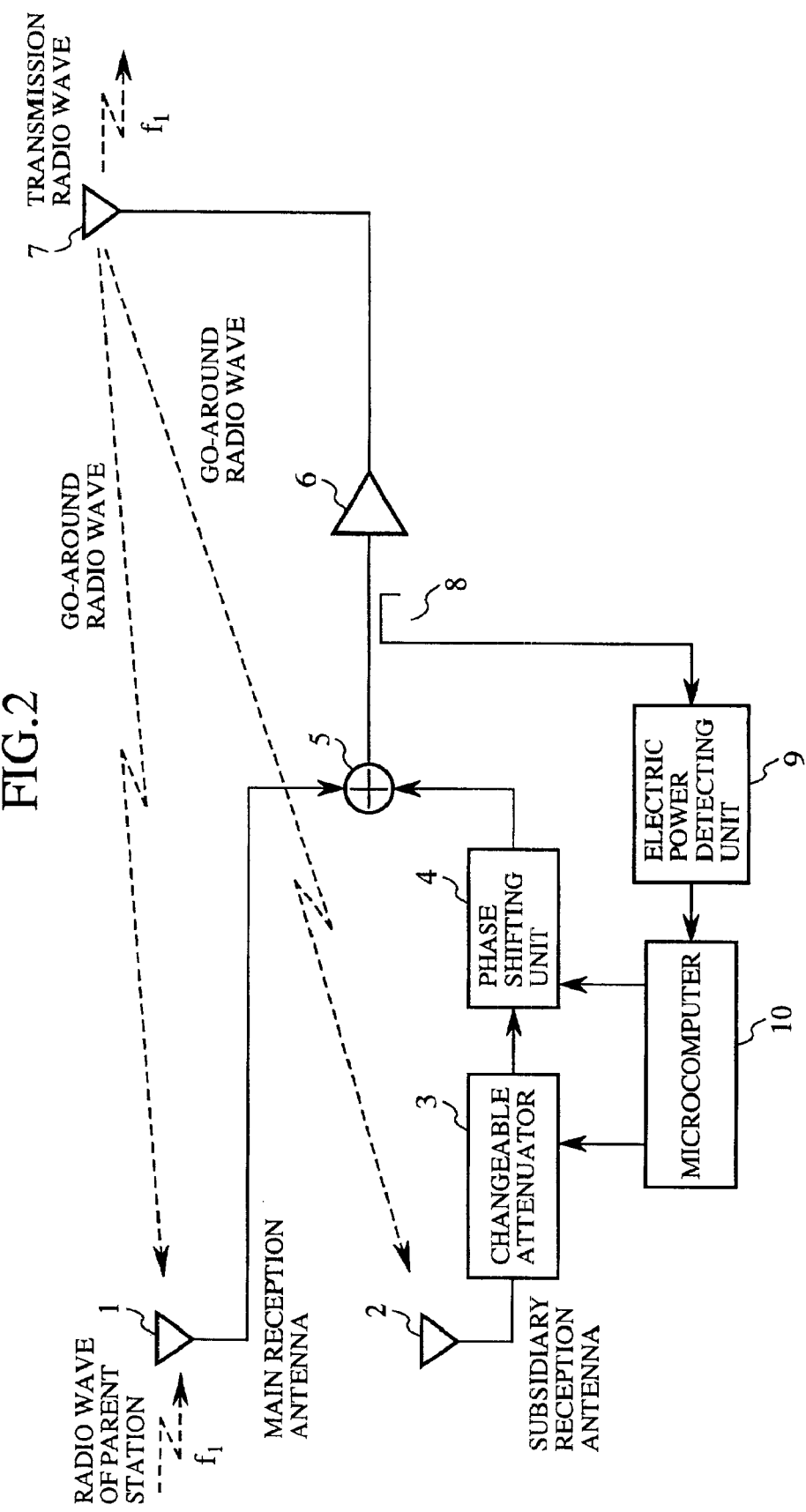
FIG. 2 is a block diagram showing the configuration of a relay device according to a first embodiment of the present invention.

FIG. 2 is a block diagram showing the configuration of a relay device according to a first embodiment of the present invention. In FIG. 2, 8 indicates a directivity coupling unit (or directivity coupler) for extracting a composite voltage of the composite signal output from the composite signal producing unit 5. 9 indicates an electric power detecting unit (or electric power detector) for obtaining a composite electric power from the composite voltage extracted in the directivity coupling unit 8. 10 indicates a microcomputer for controlling an attenuation factor of the changeable attenuator 3 and a shifting phase value of the phase shifting unit 4 so as to minimize an average value of the composite electric power obtained in the electric power detecting unit 9. The other constitutional elements are the same as or equivalent to those of the conventional relay device shown in FIG. 1.

Next, an operation will be described below.

A composite voltage output from the composite signal producing unit 5 is extracted in the directivity coupling unit 8, a composite electric power is obtained in the electric power detecting unit 9 from the composite voltage extracted in the directivity coupling unit 8, and the composite electric power is input to the microcomputer 10.

A voltage $V_{M1}$ of a radio wave of a parent station received in the main reception antenna 1 is expressed according to an equation (1).

$$V_{M1}=V_d f(t) \tag{1}$$

In this case, a voltage $V_{M2}$ of a go-around radio wave received in the main reception antenna 1 is expressed according to an equation (2).

$$V_{M2}=V_{U1}e^{i\theta_1}f(t-\Delta t) \tag{2}$$

Here, $V_d$ denotes an average voltage of the radio wave of the parent station, $V_{U1}$ denotes an average voltage of the go-around radio wave received in the main reception antenna 1, $\theta_1$ denotes a phase of the go-around radio wave received in the main reception antenna 1, and $\Delta t$ denotes a time period from the reception of the radio wave of the parent station to the reception of the go-around radio wave in the main reception antenna 1 or the subsidiary reception antenna 2 through the processing of the radio wave in the relay device and the transmission of the go-around radio wave from the transmission antenna 7. In case of a television relay device, the time period Δt is normally equal to or higher than 1 μs.

In the same manner, a voltage $V_{s2}$ of a go-around radio wave received in the subsidiary reception antenna 2 is expressed according to an equation (3).

$$V_{s2}=V_{U2}e^{j\theta2}f(t-\Delta t) \quad (3)$$

Here, $V_{U2}$ denotes an average voltage of the go-around radio wave received in the subsidiary reception antenna 2, and θ2 denotes a phase of the go-around radio wave received in the subsidiary reception antenna 2.

Therefore, the voltage $V_N$ received in the main reception antenna 1 is expressed according to an equation (4).

$$V_M=V_{M1}+V_{M2}=V_d f(t)+V_{U1}e^{j\theta1}f(t-\Delta t) \quad (4)$$

In cases where an amplitude of a signal corresponding to the voltage $V_{s2}$ of the go-around radio wave received in the subsidiary reception antenna 2 is changed by α times (or an attenuation factor α) in the changeable attenuator 3 and a phase of the signal of the voltage $V_{s2}$ is changed by φ (or a shifting phase value φ) in the phase shifting unit 4, an composite voltage $V_0$ output from the composite signal producing unit 5 is expressed according to an equation (5).

$$V_0=V_d f(t)+(V_{U1}e^{j\theta1}+\alpha V_{U2}e^{j(\theta2+\phi)})f(t-\Delta t) \quad (5)$$

Thereafter, the composite voltage $V_0$ is squared in the electric power detecting unit 9 to obtain a composite electric power.

$$V_0^2=V_d^2 f^2(t)+(V_{U1}e^{j\theta1}+\alpha V_{U2}e^{j(\theta2+\phi)})^2 f^2(t-\Delta t)+2V_d(V_{U1}e^{j\theta1}+\alpha V_{U2}e^{j(\theta2+\phi)})f(t)f(t-\Delta t) \quad (6)$$

Here, when the condition Δt>1 μs is satisfied, an average of f(t) f(t−Δt) is equal to 0 due to the characteristics of the OFDM method of the terrestrial digital broadcasting. Therefore, an average value of the composite electric power is obtained according to an equation (7).

$$|V_0^2|=|V_d^2 f^2(t)|+|(V_{U1}e^{j\theta1}+\alpha V_{U2}e^{j(\theta2+\phi)})^2 f^2(t-\Delta t)| \quad (7)$$

Here, |a| denotes an average of the symbol "a". In this case, it is applicable that the average value $|V_0^2|$ of the composite electric power be obtained in the electric power detecting unit 9 and be output to the microcomputer 10. Also, it is applicable that the average value $|V_0^2|$ of the composite electric power be obtained in the microcomputer 10.

Also, to cancel the go-around radio wave, the attenuation factor α of the changeable attenuator 3 is set according to an equation (8).

$$V_{U1}=\alpha V_{U2} \rightarrow \alpha=V_{U1}/V_{U2} \quad (8)$$

Also, the shifting phase value φ of the phase shifting unit 4 is set according to an equation (9).

$$\theta2+\phi=\theta1+\pi \rightarrow \phi=\theta1-\theta2+\pi \quad (9)$$

When the condition of the equation (9) is satisfied, $$e^{j(\theta2+\phi)}=e^{j(\theta1+\pi)}=e^{j\theta1}e^{j\pi}=-e^{j\theta1}$$

is obtained. Also, when the condition of the equation (8) is satisfied, the second term of the equation (7) is equal to 0.

Therefore, it is realized that the go-around radio wave is canceled out in the composite voltage output from the composite signal producing unit 5.

As is described above, in cases where the attenuation factor α of the changeable attenuator 3 and the shifting phase value φ of the phase shifting unit 4 are set as operation points of both the changeable attenuator 3 and the phase shifting unit 4 so as to minimize the average value $|V_0^2|$ of the composite electric power, it is realized that the relay device is set to a state of the canceling-out of the go-around radio wave.

Accordingly, in the first embodiment, in cases where the environment of the relay device is changed due to wind or snow, the attenuation factor of the changeable attenuator 3 and a degree of phase shifted in the phase shifting unit 4 are controlled by the microcomputer 10 so as to minimize the average value $|V_0^2|$ of the composite electric power. Therefore, the go-around radio wave can be canceled out while being adapted for a change of the environment. Also, in this algorithm, it is not required to superpose a relay device identification signal identifying the go-around radio wave on the transmission radio wave of the relay station.

Embodiment 2

In the first embodiment, on the assumption that initial operation points of both the changeable attenuator 3 and the phase shifting unit 4 are set when the relay device is installed in the relay station, the relay device is operated while being adapted for a change of the environment. However, it is possible to automatically obtain the initial operation points.

Figure 3:
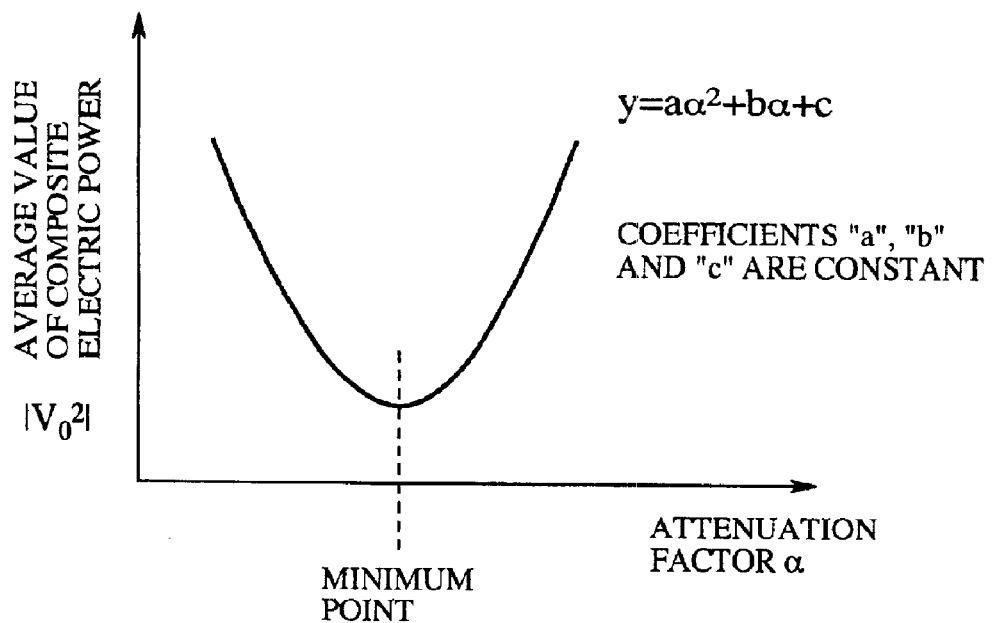
FIG. 3 is a view showing a characteristic of a change of an average value of a composite electric power due to a change of an attenuation factor of a changeable attenuator according to a second embodiment of the present invention.

FIG. 3 is a view showing a characteristic of a change of the average value $|V_0^2|$ of the composite electric power due to a change of the attenuation factor α of the changeable attenuator 3. As shown in FIG. 3, a change of the average value $|V_0^2|$ of the composite electric power with respect to the attenuation factor α of the changeable attenuator 3 is expressed by a quadratic curve, and an operation point corresponding to the canceling-out of the go-around radio wave is placed at a point of FIG. 3 at which the average value $|V_0^2|$ of the composite electric power is minimized. Therefore, when the supply of an electric power to the relay device is started, the minimum point of the average value $|V_0^2|$ of the composite electric power is detected while changing the attenuation factor α little by little by using the microcomputer 10.

Figure 4:
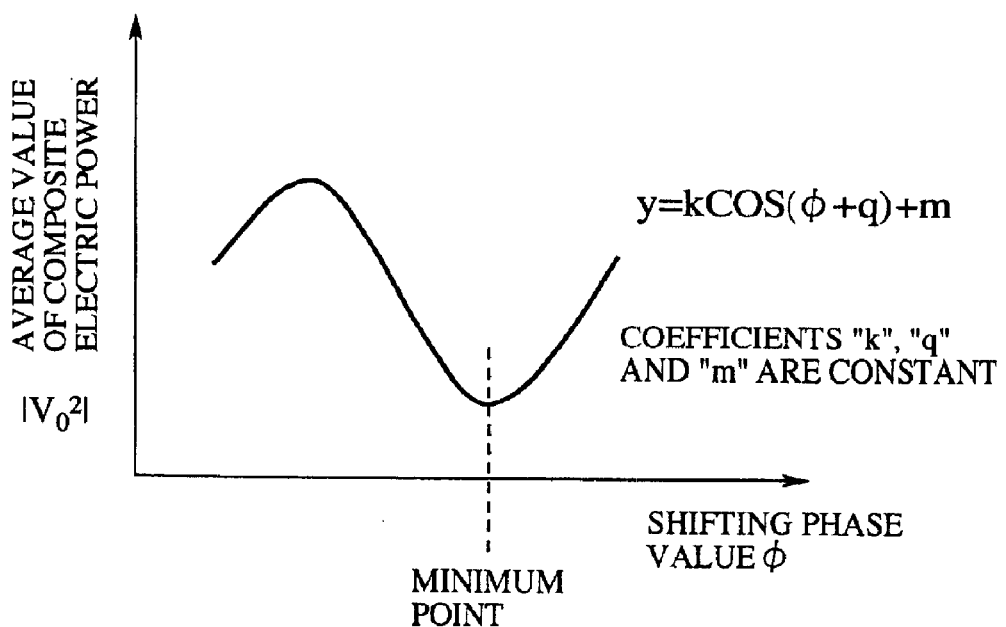
FIG. 4 is a view showing a characteristic of a change of an average value of a composite electric power due to a change of a value of a phase shifted in a phase shifting unit according to the second embodiment of the present invention.

FIG. 4 is a view showing a characteristic of a change of the average value $|V_0^2|$ of the composite electric power due to a change of the value φ of the phase shifted in the phase shifting unit 4. As shown in FIG. 4, a change of the average value $|V_0^2|$ of the composite electric power with respect to the shifting phase value φ is expressed by a cosine curve, and an operation point corresponding to the canceling-out of the go-around radio wave is placed at a point of FIG. 4 at which the average value $|V_0^2|$ of the composite electric power is minimized. Therefore, in the same manner as in the above case, the minimum point of the average value $|V_0^2|$ of the composite electric power is detected while changing the phase shifting value φ little by little by using the microcomputer 10.

As is described above, in the second embodiment, the initial operation point, at which the average value $|V_0^2|$ of the composite electric power is minimized, can be automatically detected. Therefore, when the relay device is installed in the relay station, it is not required to set operation points of both the changeable attenuator 3 and the phase shifting unit 4 by measuring the amplitude and phase of the go-around radio wave.

Embodiment 3

In the first embodiment, when the relay device is installed in the relay station, the initial operation points of both the changeable attenuator 3 and the phase shifting unit 4 are measured and set. However, when the supply of an electric power to the relay device is suddenly started, the go-around radio wave cannot be sufficiently canceled out due to measurement errors of the initial operation points. Therefore, there is a probability that a signal oscillation occurs in the relay device.

Also, in the second embodiment, the initial operation points of both the changeable attenuator 3 and the phase shifting unit 4 are automatically detected by the microcomputer 10. However, the go-around radio wave cannot be sufficiently canceled out during the detection of the initial operation points. Therefore, in the same manner, there is a probability that a signal oscillation occurs in the relay device.

Figure 5:
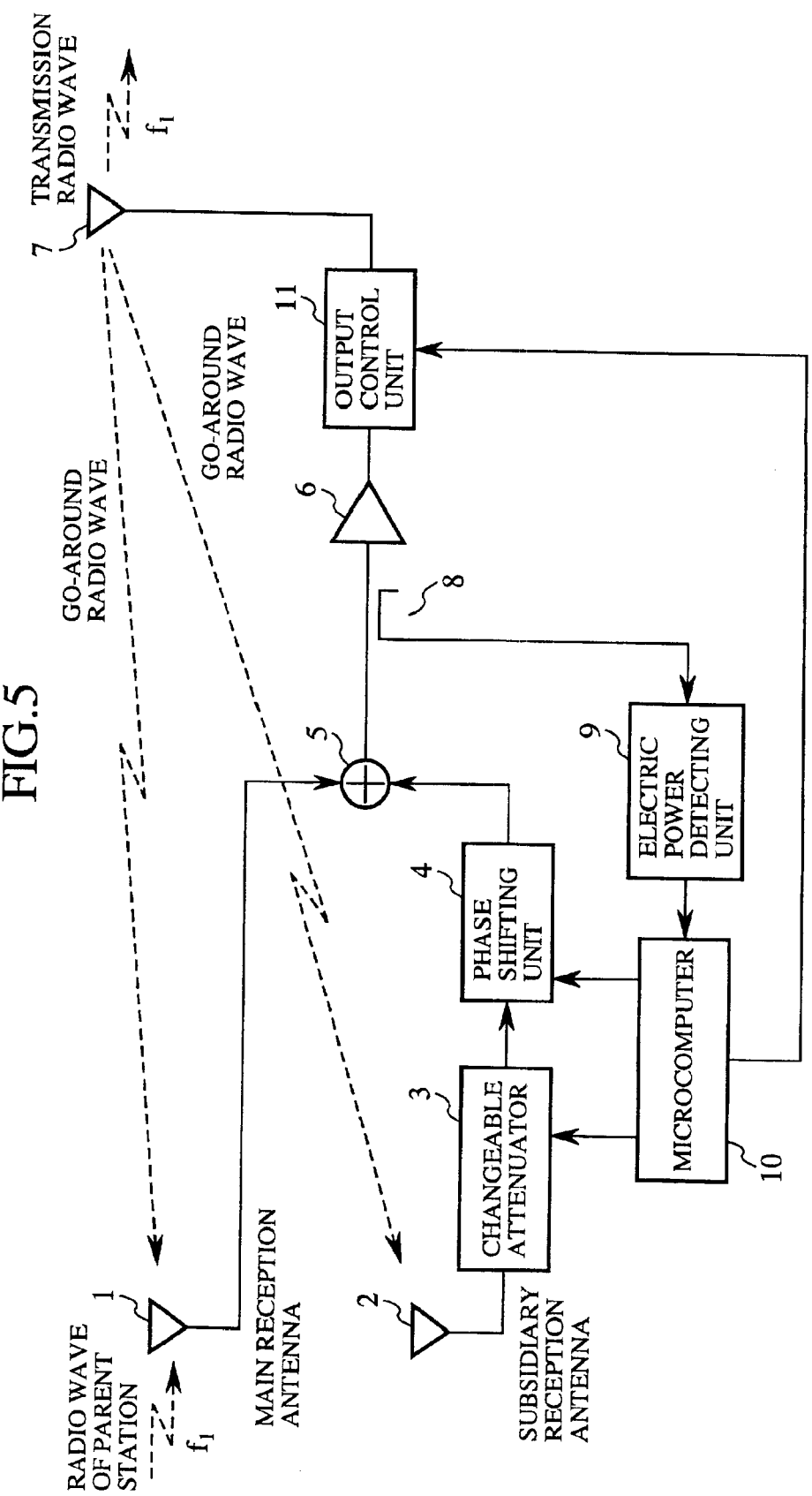
FIG. 5 is a block diagram showing the configuration of a relay device according to a third embodiment of the present invention.

FIG. 5 is a block diagram showing the configuration of a relay device according to a third embodiment of the present invention. In FIG. 5, 11 indicates an output control unit (or output controller) for controlling an output of the amplifying unit 6 by using the microcomputer 10 and outputting the output of the amplifying unit 6 to the transmission antenna 7.

Next, an operation will be described below.

When the supply of an electric power to the relay device is started, an output of the output control unit 11 is set to zero under the control of the microcomputer 10 to control the relay device not to output a transmission radio wave from the relay device. In this case, an output value of the electric power detecting unit 9 is stored in the microcomputer 10. Because no go-around radio wave is included in this output value of the electric power detecting unit 9, the output value indicates a reception level of the radio wave of the parent station. Thereafter, the output control unit 11 is controlled by the microcomputer 10 so as to heighten an output level (or output value) of the relay device little by little until the output level of the relay device reaches a regular output level. Therefore, a signal oscillation occurring in the relay device can be avoided.

In this case, a threshold value is preset to a value ranging from the output value stored in the microcomputer 10 to the double of the output value. When an electric power detected in the electric power detecting unit 9 is equal to or higher than the preset threshold value, operation points set in both the changeable attenuator 3 and the phase shifting unit 4 differ from optimum operation points at which the average value $|V_o^2|$ of the composite electric power is minimized. Therefore, the electric power equal to or higher than the preset threshold value indicates that the go-around radio wave is not canceled out. In this case, an output of the relay device is fixed at the operation points under the control of the output control unit 11, the optimum operation points are detected in the same manner as in the case of the change of the environment, and the output of the relay device is gradually heightened.

Also, while the initial operation points of both the changeable attenuator 3 and the phase shifting unit 4 are automatically detected by using the microcomputer 10, the output level of the output control unit 11 is fixed to an appropriate level, which is equal to or lower than half of the regular output level, according to an instruction sent from the microcomputer 10. In this case, because an oscillation condition for the relay device is not satisfied, a signal oscillation occurring in the relay device can be avoided.

As is described above, in the third embodiment, an output level of the relay device is controlled by the output control unit 11 according to the control of the microcomputer 10. Therefore, when the supply of an electric power to the relay device is started or initial operation points are automatically detected by the microcomputer 10, the oscillation occurring in the relay device can be suppressed.

INDUSTRIAL APPLICABILITY

As is described above, in a relay device according to the present invention, a transmission radio wave having the same frequency as that of a radio wave received from a parent station is transmitted. Therefore, the relay device is appropriate to the canceling-out of a go-around radio wave while being adapted for a change of an environment of the relay device caused by wind or snow.

What is claimed is:

1. A relay device, in which a radio wave of a parent station is received and amplified and a transmission radio wave having the same frequency as that of the radio wave of the parent station is transmitted, comprising:

a main reception antenna for receiving both the radio wave of the parent station and a go-around radio wave of a relay station;

a subsidiary reception antenna for receiving the go-around radio wave of the relay station;

a changeable attenuator for changing an amplitude of a signal of the go-around radio wave received by the subsidiary reception antenna;

a phase shifter for changing a phase of the signal of the go-around radio wave received by the subsidiary reception antenna;

a composite signal producer for producing a composite signal from a signal of the radio wave of the parent station received by the main reception antenna, the signal of the go-around radio wave of the relay station and the signal of which the amplitude is changed by the changeable attenuator and the phase is changed by the phase shifter;

a directivity coupler for extracting a composite voltage of the composite signal output from the composite signal producer;

an electric power detector for obtaining a composite electric power from the composite voltage extracted by the directivity coupler; and a microcomputer for controlling both a change of the amplitude performed by the changeable attenuator and a change of the phase performed by the phase shifter so as to minimize an average value of the composite electric power obtained by the electric power detector.

2. A relay device according to claim 1, further comprising:

an output controller for controlling an output of the transmission radio wave transmitted from the relay station according to an instruction of the microcomputer when the supply of an electric power is started.

3. A relay device according to claim 1, wherein an initial operation point of the changeable attenuator and an initial operation point of the phase shifter are automatically detected by the microcomputer by obtaining a minimum value of the composite electric power obtained by the electric power detector.

4. A relay device according to claim 1, further comprising:

an output controller for controlling an output of the transmission radio wave transmitted from the relay station according to an instruction of the microcomputer when an initial operation point of the changeable attenuator and an initial operation point of the phase shifter are automatically detected by the microcomputer.

* * * * *